United States Patent
Sen

(10) Patent No.: US 8,254,847 B2
(45) Date of Patent: Aug. 28, 2012

(54) DISTRIBUTED WIRELESS COMMUNICATIONS FOR TACTICAL NETWORK DOMINANCE

(75) Inventor: Robi Sen, McLean, VA (US)

(73) Assignee: Department 13, LLC, Mclean, VA (US)

( * ) Notice: Subject to any disclaimer, the term of this patent is extended or adjusted under 35 U.S.C. 154(b) by 1169 days.

(21) Appl. No.: 12/103,983

(22) Filed: Apr. 16, 2008

(65) Prior Publication Data

US 2008/0261509 A1    Oct. 23, 2008

(51) Int. Cl.
*H04B 17/00* (2006.01)

(52) U.S. Cl. .......... 455/67.11; 455/414.4; 455/557; 455/556.1; 455/80; 455/450; 370/338; 370/328; 370/315; 342/357.4; 385/101

(58) Field of Classification Search .......... 455/67.11, 455/450, 80, 557, 556.1, 414.4
See application file for complete search history.

(56) References Cited

U.S. PATENT DOCUMENTS

| | | | | |
|---|---|---|---|---|
| 7,020,701 B1 * | 3/2006 | Gelvin et al. | ......... | 709/224 |
| 7,135,967 B2 * | 11/2006 | Culpepper et al. | ....... | 340/539.21 |
| 7,138,914 B2 * | 11/2006 | Culpepper et al. | ....... | 340/539.13 |
| 7,375,654 B2 * | 5/2008 | Culpepper et al. | ....... | 340/995.15 |
| 7,509,124 B2 * | 3/2009 | O'Neil | ......... | 455/432.2 |
| 7,546,118 B2 * | 6/2009 | Camp, Jr. | ......... | 455/418 |
| 7,630,736 B2 * | 12/2009 | Wang | ......... | 455/553.1 |
| 7,739,402 B2 * | 6/2010 | Roese et al. | ......... | 709/242 |
| 7,750,801 B2 * | 7/2010 | Culpepper et al. | ....... | 340/539.13 |
| 7,801,058 B2 * | 9/2010 | Wang | ......... | 370/254 |
| 7,852,761 B2 * | 12/2010 | Neugebauer | ......... | 370/230.1 |
| 7,898,977 B2 * | 3/2011 | Roese et al. | ......... | 370/254 |
| 8,011,013 B2 * | 8/2011 | Bacastow | ......... | 726/27 |
| 8,087,092 B2 * | 12/2011 | Richardson et al. | ....... | 726/33 |

* cited by examiner

*Primary Examiner* — Marceau Milord
(74) *Attorney, Agent, or Firm* — Steven J Shattil

(57) ABSTRACT

Ad-hoc networks employing cooperative signal processing are configured for detecting, identifying, and visualizing radio communication networks used by an adversary, such as enemy combatants or criminals. These networks are further configured for performing a non-passive tactical response to an adversary's communication capabilities. Such ad-hoc networks are particularly useful for identifying radio communication resources, establishing radio links, and subverting an adversary's communication capabilities in environments lacking available communication infrastructure, including battlefield environments, and locations where communication infrastructure is non-existent or has been compromised by natural disasters or terrorists attacks.

7 Claims, 5 Drawing Sheets

DISTRIBUTED WIRELESS COMMUNICATIONS FOR TACTICAL NETWORK DOMINANCE

BACKGROUND OF THE INVENTION

I. Field of the Invention

The present invention relates generally to wireless sensor networks, and particularly to wireless sensor networks configured to interact with the environment that they monitor.

II. Description of the Related Art

A wireless sensor network (WSN) comprises spatially distributed autonomous devices using sensors to cooperatively monitor physical or environmental conditions, such as temperature, sound, vibration, pressure, motion, or pollutants, at different locations. The development of wireless sensor networks was originally motivated by military applications such as battlefield surveillance. However, wireless sensor networks are now used for many civilian applications, including environment and habitat monitoring, healthcare applications, home automation, and traffic control.

Area monitoring is a typical application of WSNs. In area monitoring, the WSN is deployed over a region where some phenomenon is to be monitored. As an example, a large quantity of sensor nodes could be deployed over a battlefield to detect enemy intrusion. When the sensors detect the event being monitored (heat, pressure, sound, light, electromagnetic field, vibration, etc), the event is reported to a base station, which can take appropriate action (e.g., send a message on the internet or to a satellite). Depending on the application, different objective functions employ different data-propagation strategies, depending on one or more predetermined parameters, such as need for real-time response, data redundancy (which is typically handled via data aggregation techniques), need for security, etc.

WSNs are typically designed to be deployed in large numbers in various environments, including remote and hostile regions. Ad-hoc communications are employed for linking the sensors together. Algorithms and protocols have been developed to address issues associated with self-configuration, information routing, lifetime maximization, robustness, and fault tolerance.

SUMMARY OF THE INVENTION

Embodiments disclosed herein may be advantageous to systems employing wireless transceiver networks for surveillance, battlefield, and first-responder applications. However, the invention is not intended to be limited to such systems, as other wireless networking applications may benefit from similar advantages.

While prior-art wireless sensor networks are purely passive in how they interact with the environment they monitor, embodiments of the invention provide for a wireless transceiver network configured to collect radio-spectrum information and track radio signals, then actively respond to an adversary's radio network, such as by spoofing, misdirecting, corrupting, and/or jamming signals used in the adversary's radio network.

Embodiments of the invention provide for a tactical network dominance (TND) system comprising a plurality of small computational devices acting as a cluster configured to perform specific computational process, such as signal processing, to be shared across nodes and/or allocated to inactive nodes. In one embodiment, each of the computational devices is configured to perform a predetermined computational process. In another embodiment, each of the computational devices is dynamically assigned a computational process to perform. For example, embodiments of the invention may be configured to create virtual antenna arrays on the fly to adapt to specific communication needs and/or channel conditions.

Embodiments of the invention may be optimized for minimum processing complexity, such as to enable suitability for real-time applications, rapid updates, low power consumption, and/or low-cost components. Particular embodiments of the invention may be configured to provide for the previously recited features and advantages and/or alternative features and advantages.

Although particular embodiments are described herein, many variations and permutations of these embodiments fall within the scope and spirit of the invention. Although some benefits and advantages of the preferred embodiments are mentioned, the scope of the invention is not intended to be limited to particular benefits, uses, or objectives. Rather, embodiments of the invention are intended to be broadly applicable to different wireless technologies, system configurations, networks, and transmission protocols, some of which are illustrated by way of example in the figures and in the following description of the preferred embodiments. The detailed description and drawings are merely illustrative of the invention rather than limiting, the scope of the invention being defined by the appended claims and equivalents thereof.

BRIEF DESCRIPTION OF THE DRAWINGS

Embodiments according to the present invention are understood with reference to the following figures.

DESCRIPTION OF PREFERRED EMBODIMENTS

Figure 1:
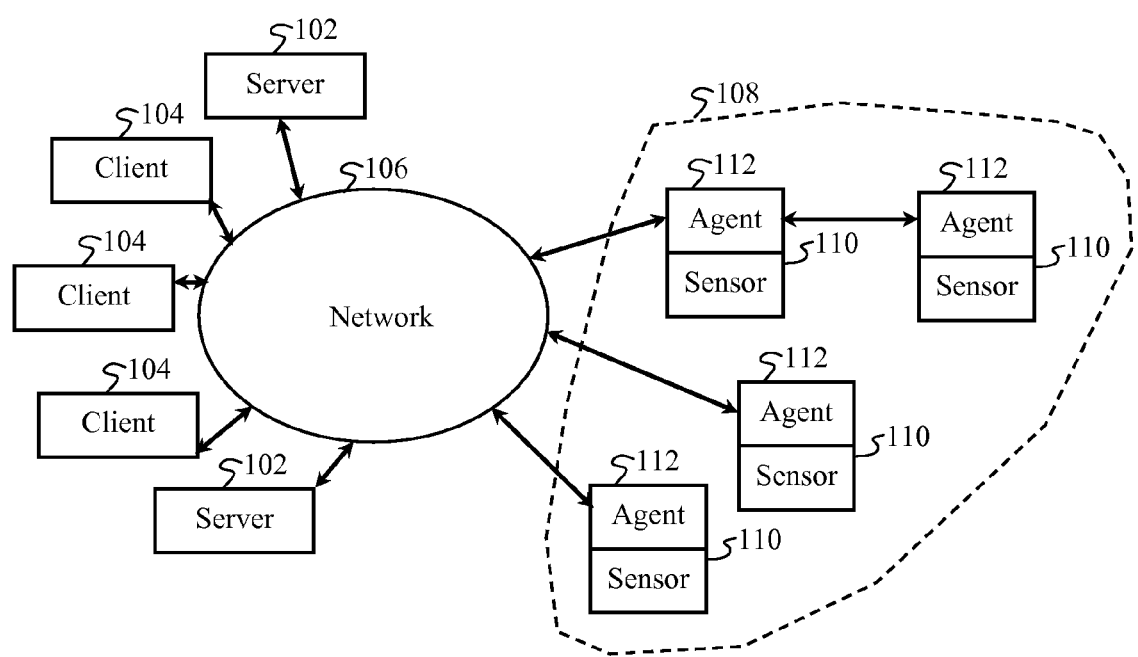
FIG. 1 shows an embodiment of a TND system of the present invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the spirit and scope of the invention as defined by the claims.

A tactical network dominance (TND) transceiver, as used herein, comprises a radio receiver (e.g., a sensor) configured for detecting an external radio communication link (i.e., a radio communication link used in a radio network other than the TND network used by the TND transceiver to communicate with other TND transceivers and a central server), and a radio transmitter used for providing a non-passive tactical response to the detected radio communication link. The TND transceiver further comprises network-communication circuitry configured for transceiver functionality (i.e., transmitting and receiving data) with at least one other TND transceiver. The network-communication circuitry is further configured for controlling a plurality of TND transceivers, such as to coordinate reception of the external radio communication link (e.g., for performing sensing, acquisition/synchronization, diversity combining of the received signal, interference rejection, etc.). The network-communication circuitry is also configured for coordinating the non-passive tactical response of the plurality of TND transceivers to the detected radio communication link.

The TND transceiver may share circuitry (such as radio and/or baseband-processing circuitry) for different transceiver operations (e.g., TND network communications and external network transceiving operations). Alternatively, the TND may employ separate systems or subsystems dedicated to respective transceiver operations. TND transceivers may employ any combination of communications links, including (but not limited to) radio links, infra-red links, optical links, and sonic links.

An external radio communication link, as used herein, denotes a radio communication link used in a radio network other than a network used by the TND transceiver to communicate with other TND transceivers and a central server. For example, an external radio communication link may be identified as an external radio network employed by enemy combatants or criminals.

A non-passive tactical response, as used herein, includes transmitting a jamming signal (a jamming signal may comprise an RF jamming signal that decreases the SNR or SINR of intended signals received by receivers employing the detected radio communication link), re-transmitting a corrupted or otherwise altered radio signal received from the detected radio communication link, transmitting a spoofed signal into the radio communication link (in this case, a spoofed signal may comprise information that falsely identifies the source of the transmitted spoofed signal), transmitting a denial-of-service (DoS) attack (e.g., a DoS attack may be intended to monopolize network resources that would otherwise be allocated to intended users of the system employing the detected radio communication link). In some embodiments, TND transceivers may utilize a network providing the detected radio communication link to enable and/or enhance communication within the TND network.

In one embodiment of the invention, a sensor network comprising a plurality of sensors configured for detecting radio emissions from an external radio network is configurable for performing antenna-array processing. Antenna-array processing, as described herein, may include any combination of beam forming, tracking, null steering, interference cancellation, virtual array processing, and MIMO (multiple-input, multiple output) processing. Embodiments of the invention may provide for advanced receiver processing, including diversity reception, interference cancellation, MMSE equalization, and other equalization techniques.

In one aspect of the invention, raw data from the sensor network is processed by a central server configured to perform antenna-array processing. In another aspect of the invention, the sensors in the sensor network further comprise computing circuitry, which is configured to share information and act as a clustered computing environment via the network-communication circuitry. Embodiments of the invention may provide for multiple clusters of sensors and/or TND transceivers, and furthermore, may provide for multi-tiered clustering, such as clusters of clusters. Thus, array processing may be implemented by a plurality of the sensors. In the case where the sensors are TND transceivers, array processing may be implemented for transmitting signals to the external radio network for communications and/or for providing a non-passive tactical response.

FIG. 1 illustratively represents a simplified embodiment of a TND system 100 of the present invention. As shown, the system 100 includes one or more servers 102 in network communication with a plurality of clients 104. Although for clarity of presentation, the simplified embodiment of FIG. 1 depicts only a limited number of clients 104 and servers 102, other embodiments may include relatively larger number of clients and servers in communication over a communication network 106.

The servers 102 are configured to receive data streamed from one or more networks 108 of TND transceivers deployed within geographic regions of interest (e.g., a densely-populated urban center, a battlefield, or a military installation). Base stations in the TND networks may be distinguished from TND transceivers in that they possess much more computational, energy, and communication resources. The base stations act as a gateway between TND networks 108 and the servers 102. Each TND transceiver network 108 includes a plurality of sensors (e.g., radio receivers) 110 coupled to corresponding sensor modules or "agents" 112. Each transceiver agent 112 controls the relaying of data between a corresponding radio receiver 110 to one or more modules executed by a server 102. Consistent with one aspect of the invention, the parameters of the data-relaying function effected by the transceiver agents 112 (e.g., frequency of reporting) may be controlled by the clients 104. In the embodiment of FIG. 1, each transceiver agent 112 is depicted as being co-located with a corresponding radio receiver 110. In other embodiments, the transceiver agents 112 may be executed by the server 102 such that each is configured to receive and process "raw" data from an associated radio receiver 110.

Multiple TND transceivers may be dropped, placed, or deployed over areas of tactical operation and configured to couple with systems that control and visualize information from the TND transceivers. Each TND transceiver searches for and identifies other TND transceivers in its immediate area and links with them to build a secure local network. The TND transceivers may be further configured with computing circuitry (e.g., a microprocessor with data storage) to share information and perform computational processing as a clustered computing environment.

Information relayed between TND transceivers are generally transmitted in an encrypted form. In general, an end-to-end encryption may be selected. For example, sensed data may be encrypted directly at a sensor node and only decrypted after receipt at a sink node. Security in the context of data transmission in sensor networks can be achieved by key distributions. One such key distribution mechanism for pairwise secure communication is for example described in L. Eschenauer, V. Gligor, "A key-management Scheme for Distributed Sensor Networks", in the proceedings of $9^{th}$ ACM Conference on Computer and Communications Security (CCS'02), 41-47, November, 2002, which is hereby incorporated by reference. According to this work, in every sensor node of a sensor network, a small number of keys is stored wherein the stored key set is taken out from a commonly used key pool. Embodiments of the invention may employ symmetric encryption methods, which minimizes the amount of information that can be retrieved by tampering with individual TND transceivers.

A TND transceiver network may be divided into specific areas, such as routable regions. Embodiments of the invention may employ a cluster-based hierarchical routing method in which a wireless sensor network is divided into plural regions of cluster units, and a cluster is classified into cluster heads, a sink node, and sensor nodes. The hierarchical routing method performs routing via a relay node and the sink node in order to reduce overall transmit power.

Within a routable region, the data sensed by each TND transceiver is sent to a sink node by means of reverse multicast traffic. For example, TND transceivers encrypt their data and send it via relay-nodes (e.g., other TND transceivers), which only forward data, and/or aggregator nodes (which also may comprise TND transceivers), which aggregate the data of several TND transceivers and forward it, to the sink node.

An exemplary embodiment and/or exemplary method of the present invention may provide for energy-efficient and time-efficient exchanges of information between any two or more devices using short pulses or tones instead of packets, which may be, for example, used to supervise the devices and their connectivity status, or to synchronize the devices.

Each client 104 comprises a software module used to perform data processing, including digital signal processing and data visualization. The system may employ maps and various overlays based upon information delivered from one or more of the servers 102. All of the relevant information can be overlaid on a map of the region of interest to facilitate the decision-making process by providing critical information in an easy-to-digest format for display. In one embodiment, each client 104 is created in the Microsoft.NET framework, and may be executed by conventional computer platforms within command and control centers as well as by mobile computing devices (e.g., PDAs) distributed to personnel in the geographic region of interest. Furthermore, demodulation (including despreading and/or decoding) may be employed to intercept information from the transmitted signal for intelligence gathering.

As is described below, the TND system is designed to provide superior receiver sensitivity using real-time software that networks existing sensors and other radio receivers into an antenna array. In one exemplary embodiment, the TND system continuously and automatically scans the radio spectrum in the geographic regions of interest. When a signal of interest is detected, array-processing algorithms and/or advanced receiver algorithms may be applied to the received data to provide triangulation or direction finding to identify the location of the signal's source. This enables immediate generation of alerts to proper authorities, agencies, or tactical groups to identify the detected radio link and the location of its users.

Advanced receivers typically employ a combination of LMMSE equalization (or some other form of equalization) and receive diversity. Advanced receivers based on receive diversity have been studied for WCDMA and have demonstrated significant performance improvements, particularly at low SNR, such as shown in 3GPP TS 25.101 V6.8.0, "User Equipment (UE) Radio Transmission and Reception (FDD)", June 2005, which is hereby incorporated by reference.

Each client 104 comprises a software module configured to perform identification of a radio communication link. For example, a radio communication system and/or user associated with the link may be determined. Some embodiments may provide for comparing spectral parameters (e.g., frequency band and/or signal bandwidth) of a received signal to a look-up table containing spectral parameters corresponding to known communication systems. The software module may determine the identity of the communication system supporting the detected radio communication link, or at least determine the type of communication system employing the detected link. The software module may employ despreading, demodulation, and/or decoding to identify the source of the link and/or users employing the link.

The client 104 may comprise a software module configured to perform array processing for tracking the location of one or more radio transmissions. Such radio transmissions that may be monitored include either or both adversary transmissions and transmissions originating from known, or "friendly," users or communication networks.

Once the TND transceivers have established connections with other TND transceivers and provided data to the client 104 that allows identification of an adversary's radio network, the TND system may transition to a network-dominance mode to allow users of the client 104 to infiltrate, corrupt, disable, spoof, or exploit communication resources of the adversary's local network infrastructure.

The client 104 may comprise a software module configured for providing an active tactical response targeting an adversary's radio communication network. A tactical response software module may comprise antenna-array processing software for directing transmissions to the adversary's radio communication network. Such array-processing software may be configured to perform retro-directive array processing, such as may be based on angle-of-arrival data of received signal and/or channel estimates of the propagation environment between the TND transceiver network 108 and an adversary's radio transmitter.

Data from one or more software modules is coupled to each transceiver agent 112, which controls the relaying of data to a corresponding radio transmitter 111. Data from the software modules may include control information, such as to configure the amplitude, timing, and/or phase of signals transmitted by each radio transmitter 111.

Figure 2:
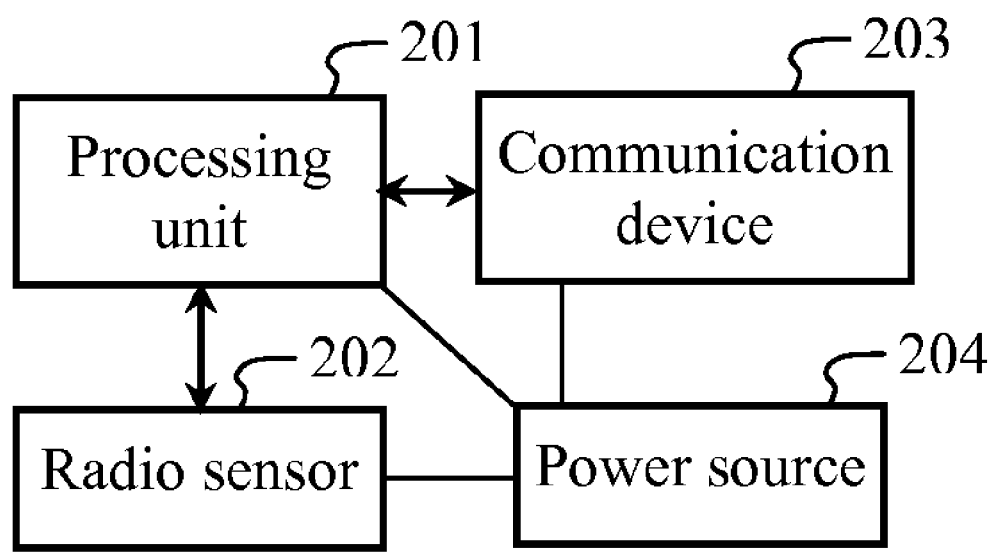
FIG. 2 illustrates a TND transceiver in accordance with an embodiment of the invention.

FIG. 2 illustrates a TND transceiver in accordance with an embodiment of the invention. The TND transceiver typically has an exterior shell designed to protect contained electronics from impact, moisture, dust, and optionally, other environmental and/or operational hazards that would otherwise damage or impede the function of the electronics. The TND transceiver usually comprises a processing unit 201 with limited computational power and limited memory, at least one radio sensor 202 (including specific conditioning circuitry), a communication device 203 (usually a radio transceiver or alternatively an optical transceiver) configured for communicating with other TND transceivers and/or a predetermined access point, and a power source 204—usually in the form of a battery. Other possible inclusions are energy harvesting modules (not shown), secondary ASICs (not shown), and possibly secondary communication devices (not shown), such as RS232 or USB devices.

In one aspect of the invention, the sensor 202 comprises a radio-frequency (RF) receiver, such as an antenna, an RF front-end, and an analog-to-digital converter (ADC). The RF front-end may be configured for performing any combination of well-known radio signal processing operations, including, but not limited to frequency down-conversion and filtering. Optionally, a baseband processor may be provided for despreading, demodulating, decoding, and/or otherwise processing received down-converted signals. The processing unit 201 comprises network-communication circuitry for data acquisition and communication with other TND transceivers or a base station, and computing circuitry, such as may be required for receiver processing (e.g., Rake processing, equalization, array processing, coding/decoding operations, direction finding, acquisition/synchronization, etc.). The computing circuitry may be employed for identifying, allocating, and coordinating computing resources with other TND transceivers.

In another aspect of the invention, the sensor comprises an RF transmitter sharing the components employed by the RF receiver. Consequently, the transmitter may comprise the baseband processor, which may be configurable for performing channel coding, modulation, spreading, and/or additional or alternative baseband signal processing operations. The ADC may be configured for performing digital-to-analog conversion of a baseband signal intended for transmission. The RF front-end may be configured for performing frequency up-conversion, transmit filtering, amplification, and/or additional or alternative RF front-end processing operations that are known in the art.

Figure 3:
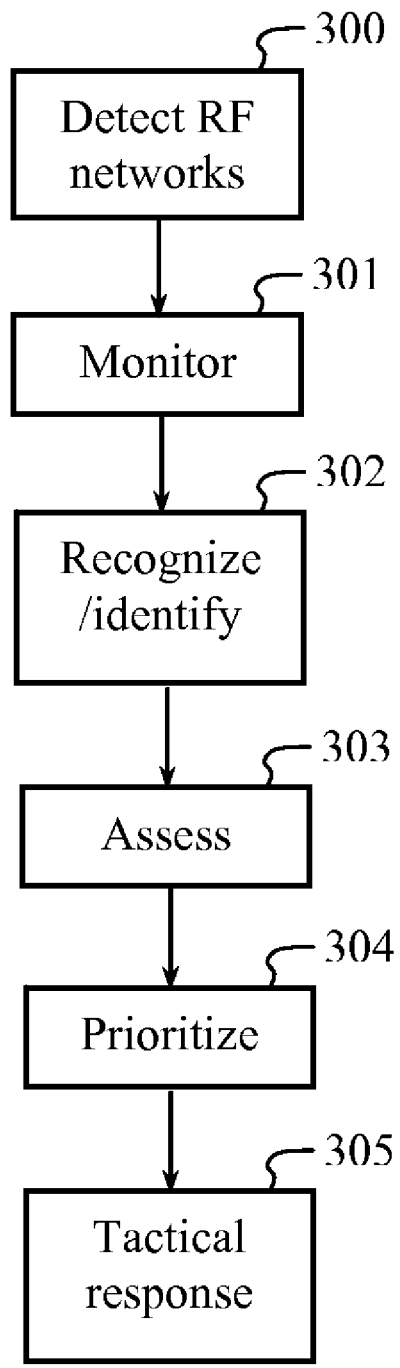
FIG. 3 illustrates a method embodiment of the invention.

Referring to FIG. 3, in an initial operative phase 300 of the system 100, the TND transceiver networks 108 and any other deployed receivers acquire data in order to detect the use of unknown radio communication networks (i.e., external radio communication links), or the presence of unknown radio communication devices. During this stage, spectral-power thresholds may also be set relative to baseline levels in order to define the presence of radio transmissions.

During the remaining phases of operation, measurement data streamed from the TND transceiver network 108 to one or more of the servers 102 may be compared against a predetermined database of radio communication networks. The database may comprise known communication networks employed by friendly forces, networks employed by neutral parties, and/or networks likely to be employed by hostile parties. Subsequent phases may be characterized as a monitor phase 301, a recognize/identify networks phase 302, an assessment phase 303, a prioritization phase 304, and a tactical-response phase 305. These phases will generally operate in the sequence depicted in FIG. 3 with respect to measured radio-signal data acquired contemporaneously during a given time period. However, since such measurement data will typically be received by the applicable server 102 in a continuous stream, it is also the case that the respective phases will operate in parallel at any given point in time (i.e., each being engaged in processing measurement data acquired during a different time period).

The processing effected by the applicable server 102 during the monitor phase 301 involves observing and recording incoming measurement data from the sensor networks 108 and identifying changes relative to thresholds set during the previous phase 300. The types of signals detected and reported during execution of the monitor phase 301 will depend on the nature of the processing performed by the clients 104 and/or the TND agents 112. For example, spectral data may be obtained via fast Fourier transform processing. In some embodiments, matched filters may be employed to identify either or both specific time-domain energy signatures and predetermined frequency-domain energy profiles. However, at the most fundamental level, the TND agents 112 connect to their associated TND transceivers 110, collect ambient sensor measurement data, and pass the raw data through the sensor network 108 to the server 102. It is noted that each TND agent 112 may represent a virtual sensor rather than a physical sensor (e.g., during performance of a simulation), but for the sake of the present discussion, it is assumed that the TND agents 112 receive data from, and are representative of, actual TND transceiver measurements.

Under normal circumstances, the TND agents 112 may stream measurement data collected by a corresponding TND transceiver 110 to the server 102 in accordance with a user-defined or default sampling frequency. For example, when battery-operated receivers are employed, it becomes important to conserve power by, for example, minimizing the power expended to communicate measurement data from such receivers to the server 102. Accordingly, in such cases each agent 112 associated with such a receiver may set a periodic sampling rate, buffer a number of the readings provided by the receiver, and then instruct that a batch of readings be transmitted at once in order to minimize power drain. If a reading hits a pre-defined "threshold" level, the applicable agent 112 can immediately change its behavior to increase the applicable sampling frequency and begin continuously streaming the readings to the server 102 rather than continue to buffer the readings received.

In one embodiment the recognize/identify networks phase 302 involves processing data only from a subset of TND transceivers that produce measurements exceeding the threshold levels set during phase 300. Although this embodiment corresponds to perhaps the most straightforward implementation, substantially more complex implementations of the identification process have also been contemplated and may be employed by alternative embodiments of the invention.

Consistent with one aspect of the invention, implementation of the assessment phase 303 may be facilitated by processing received signals to locate the direction or source of a detected transmission. Such processing may employ angle-of-arrival algorithms, triangulation, channel estimation, and/or alternative algorithms for geographically locating one or more detected radio transmitters. Furthermore, baseband signal-processing operations may be performed to determine information content of the transmitted signals for intelligence gathering in order to identify users of the network and assess the threat of these users to tactical operations.

The prioritize phase 304 involves determining, in accordance with a set of predefined rules, an appropriate response to a threat identified during the preceding assessment phase 303. In one embodiment a plurality of predefined priority values are established prior to initiating operation of the system 100, and one of these is assigned during the prioritize phase 304 to each threat identified during the assessment phase 303. As a consequence, threats which have been identified as being serious in nature can be assigned a relatively high priority value and allocated appropriate amounts of system resources. For example, system processing priority may be given to threats that are identified as high priority. In addition, the visual representations provided to end users via clients 104 may be configured to display, filter, and/or sort threat or other event information by the priority accorded such information.

Execution of the tactical-response phase 305 results in an automated, semi-automated, or manually initiated tactical response of the TND transceivers to the detected radio network. In one embodiment, these tactical responses may be specified using a rules engine configured for different scenarios based on data gathered in the assessment phase 303. This effectively permits adaptations of tactical responses to different channel conditions, different types of networks, TND transceiver locations, signal strength at each TND transceiver, transceiver resources (e.g., battery power, computational power, transmit power), region, and number of TND transceivers in the area. The tactical-response phase 305 may further include one or more of (i) notifying personnel or facilities with regard to the presence of an unknown or positively identified transmitter, (ii) sending appropriate codes to activate/deactivate automated systems (e.g., arm alarm systems, activate sensor systems, or automatically close entrances), (iii) track objects of interest, and (iv) generate a multi-layered visual representation of information pertaining to the event for display upon the clients 104.

Figure 4:
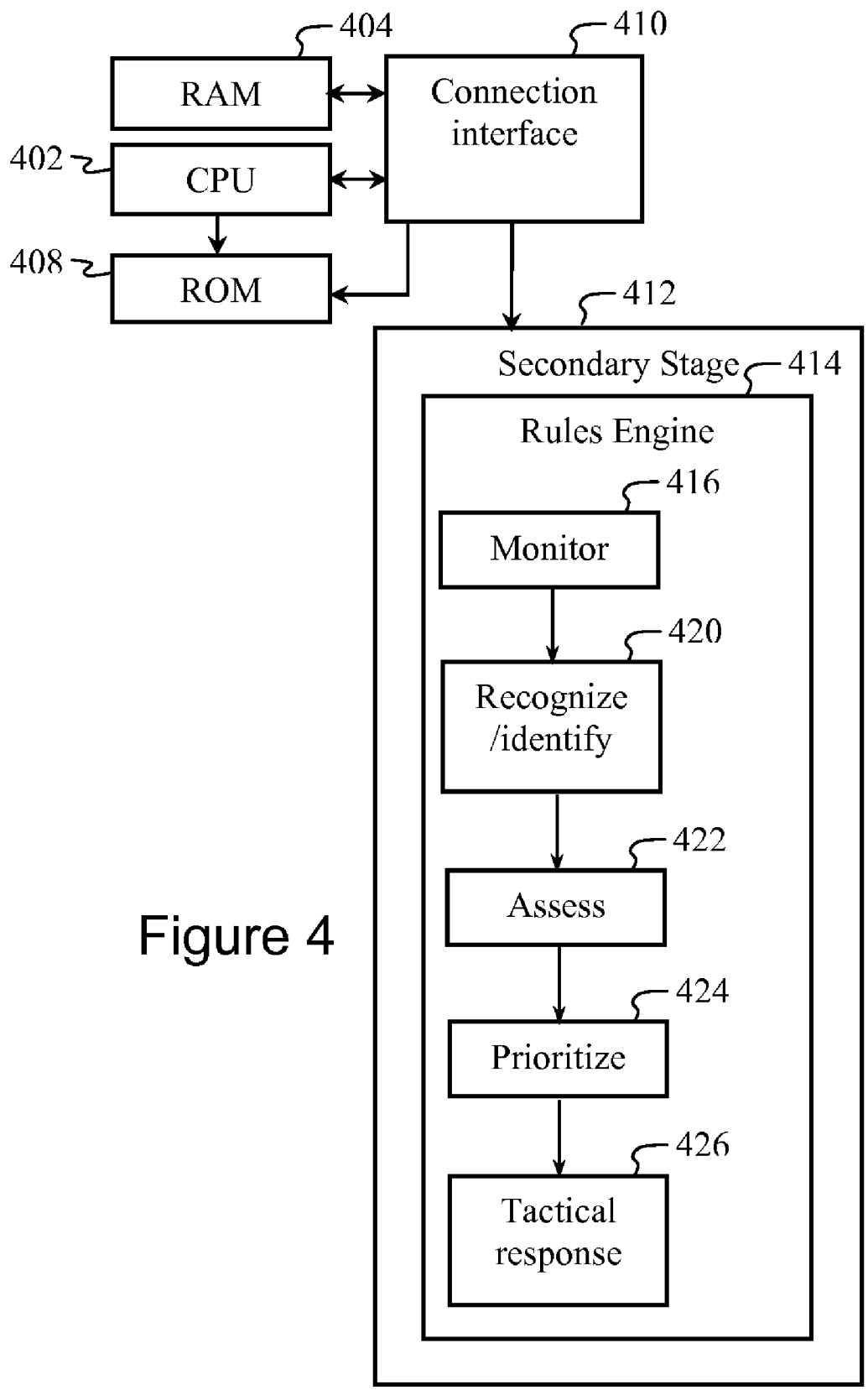
FIG. 4 is a block diagrammatic representation showing the structure of a server computer configured to execute the server in accordance with an embodiment of the invention.

FIG. 4 is a block diagrammatic representation showing the structure of a server computer 400 configured to execute the server 102. The server computer 400 includes a CPU 402 connected to RAM 404, ROM 408, a connection interface module 410 and secondary storage 412. Stored within secondary storage 412 are a set of software program modules which, when executed by the server computer 400, effect the functionality of the server 102.

A secondary storage 412 includes a rules engine 414 comprising a monitor module 416, a network recognize/identify module 420, an assessment module 422, a prioritization module 424, and a tactical-response module 426. In one embodiment, the rules engine 414 implements the intelligence of the TND system and maintains within secondary data storage 412 a representation 415 of the state of each object used in modeling the monitored environment. Secondary data storage 412 also includes a copy of the operating system for the server computer 400 (not shown). When effecting the functionality described herein, the CPU 402 loads into RAM 404 and executes one or more modules of the rules engine 414 or other program modules stored within secondary data storage 412.

Secondary data storage 412 also includes a database 430, which may contain historical receiver measurement data and other information. In one embodiment, the database 430 is accessed via interface handlers 428. Storage of such historical receiver measurement data facilitates execution of rules that involve comparison of current values to historical measurements or statistics. Historical data from the database 430 may also be made available to clients 104 for historical reporting or charting.

In an exemplary embodiment, the rules engine 414 includes a fixed set of rules comprising the base knowledge framework inherent within the rule set. In general, the rules engine prescribes a process for comparing individual or sets of received signal data or processed signal data against defined threshold values. If the applicable threshold is exceeded, determination of the presence of a radio transmitter may be assessed. The conditions for identifying, assessing, and prioritizing a transmission and creating a tactical response can be complex and involve data from many receivers, knowledge of receiver locations, historical value ranges, and a predetermined number of recent measurements. Rules may be added, deleted, and changed dynamically during runtime operation of the system 100.

During operation of the system 100, the CPU 402 executes the monitor module 416 during the monitor phase 301 in order to observe and record incoming measurement data from the sensor networks 108 and identify changes relative to predefined thresholds. The CPU 402 executes the recognize/identify module 420 during the recognize/identify phase 302 and thereby detects when the recorded measurement data exceeds the predefined thresholds levels. During the assessment phase 303, the CPU 402 executes the assessment module 422. The CPU 402 executes the prioritization module 424 during the prioritize phase 304 in order to determine, in accordance with a set of predefined rules, an appropriate response to a radio network identified during the preceding assessment phase 303. Finally, during tactical response phase 305, the CPU 402 facilitates an automated, semi-automated, or manual response of the TND network to the identified radio network.

Figure 5:
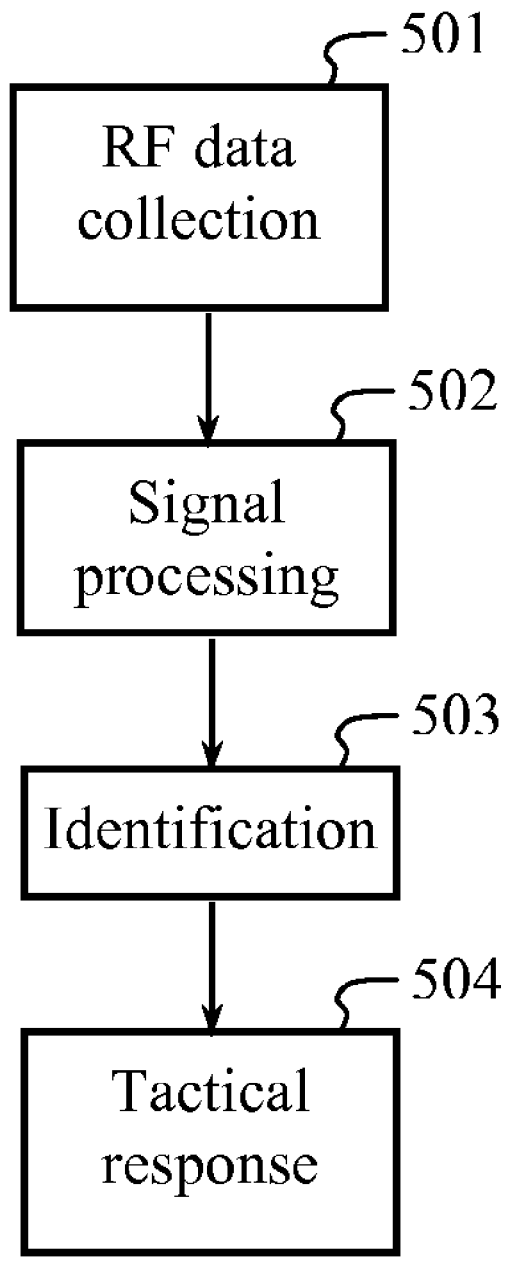
FIG. 5 shows a method embodiment of the invention.

In one embodiment of the invention, a program product stored on a computer readable medium for detecting a radio communication network and generating an active tactical response is configured to perform the method outlined in FIG. 5. The computer readable medium comprises program code for causing a computer system to collect radio-signal data 501 from a plurality of distributed transceivers, perform signal processing 502 on the radio-signal data for detecting radio transmissions, perform an identification function 503 on the detected radio transmissions for determining at least one radio communication source, and configure the plurality of distributed transceivers 504 for performing an active tactical response targeting the at least one radio communication source.

The TND system may be disposed to operate with virtually any conventional radio sensor having an electronic interface, and does not require the deployment of specialized or proprietary sensors or detectors. In some embodiments, the step of collecting radio-signal data 501 may be performed from one or more of the sensors, including mobile wireless terminals used by individuals (e.g., a PDA, a cell phone, a laptop computer) and/or fixed wireless terminals (e.g., a wireless LAN access point, a cellular base station, a satellite communication terminal) located in a geographic region of interest. In such instances, communication with the server 102 may be effected via conventional radio or data networks.

The step of signal processing 502 may be performed in a centralized computer system, such as the server 102. Alternatively, signal processing 502 may be performed by a distributed computer network, such as by a plurality of TND transceivers having computational capabilities that are networked together. Signal processing 502 may comprise processing digital samples in a matched filter or correlator for detecting the presence of a predetermined time-domain energy signature. Signal processing may comprise performing a fast Fourier transform on digital samples to generate frequency-domain data that may be processed for determining the presence of energy signatures in a predetermined spectral region. In some embodiments, signal processing 502 may comprise matched filtering the digital samples or the processed signal.

In another embodiment of the invention, computer software embodied in a propagated signal comprises instructions for causing a computer system to perform the steps 501-504 shown in FIG. 5.

It should be appreciated that the apparatus and method embodiments of the invention may be implemented using a variety of hardware and software. For example, one or more components of a TND transceiver may be implemented using special-purpose hardware, such as an application specific integrated circuit (ASIC) and programmable logic devices such as gate arrays, and/or software or firmware running on a computing device, such as a microprocessor, microcontroller or digital signal processor (DSP). It also will be appreciated that although functions of the TND transceiver may be integrated in a single device, such as a single ASIC, they may also be distributed among several devices.

The invention is not intended to be limited to the preferred embodiments. Furthermore, those skilled in the art should recognize that the method and apparatus embodiments described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium, such as a SIM card, a USB memory interface, or other computer-readable memory adapted for interfacing with a wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

The term "computer-readable medium" encompasses distribution media, intermediate storage media, execution memory of a computer, and any other medium or device capable of storing for later reading by a digital computer system a computer program implementing the method of this invention.

Various digital computer system configurations can be employed to perform the method embodiments of this invention, and to the extent that a particular system configuration is capable of performing the method embodiments of this invention, it is equivalent to the representative system embodiments of the invention disclosed herein, and within the scope and spirit of this invention.

Once digital computer systems are programmed to perform particular functions pursuant to instructions from program software that implements the method embodiments of this invention, such digital computer systems in effect become special-purpose computers particular to the method embodiments of this invention. The techniques necessary for this programming are well known to those skilled in the art of computer systems.

Various embodiments of the invention may include variations in system configurations and the order of steps in which methods are provided. In many cases, multiple steps and/or multiple components may be consolidated.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the invention. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

The functions of the various elements shown in the drawings, including functional blocks labeled as "processors" or "systems," may be provided through the use of dedicated hardware as well as hardware capable of executing software in association with appropriate software. When provided by a processor, the functions may be provided by a single dedicated processor, by a shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

Any element expressed herein as a means for performing a specified function is intended to encompass any way of performing that function including, for example, a combination of circuit elements which performs that function, or software in any form, including, therefore, firmware, micro-code or the like, combined with appropriate circuitry for executing that software to perform the function. Embodiments of the invention as described herein reside in the fact that the functionalities provided by the various recited means are combined and brought together in the manner which the operational descriptions call for. Applicant regards any means that can provide those functionalities as equivalent to those shown herein.

The invention claimed is:

1. A tactical network dominance method performed by a plurality of wireless transceivers communicatively coupled together, the method comprising:
   providing for coordinating the plurality of wireless transceivers to cooperatively detect an external radio communication link,
   providing for monitoring the external radio communication link,
   providing for identifying the external radio communication link,
   providing for assessing the external radio communication link for determining an assessed threat,
   providing for determining a non-passive tactical response to the assessed threat, and
   providing for coordinating the plurality of wireless transceivers to execute the non-passive tactical response targeting the external radio communication link, wherein at least one of providing for assessing, providing for determining, and providing for coordinating the plurality of wireless transceivers to execute the non-passive tactical response is dynamically reconfigurable based on at least one of transceiver locations, historical value ranges, and recent measurements.

2. The method recited in claim 1, wherein providing for coordinating the plurality of wireless transceivers to execute the non-passive tactical response further comprises at least one of a set of actions, the set including notifying personnel, sending codes to activate or deactivate automated systems, track users of the external radio communication link, and generate a visual representation of data gathered by the plurality of wireless transceivers.

3. A server computer configured to perform the method of claim 1.

4. A computer-readable medium comprising a program code configured to perform the method of claim 1.

5. A computer-readable medium comprising a program code for causing a computer system to collect radio-signal data from a plurality of transceivers, perform signal processing on the radio-signal data for detecting radio transmissions, perform an identification function on detected radio transmissions for determining at least one external radio communication source, and coordinate the plurality of distributed transceivers for performing a non-passive tactical response targeting the at least one external radio communication source, wherein at least one of determining, and performing the non-passive tactical response is dynamically reconfigurable based on at least one of transceiver locations, historical value ranges, and recent measurements.

6. The computer-readable medium recited in claim 5, wherein the computer system comprises the plurality transceivers, each of the plurality of transceivers having computational capabilities.

7. The computer-readable medium recited in claim 5, wherein signal processing comprises determining the presence of energy signatures in a predetermined spectral region.

* * * * *